(12) United States Patent  (10) Patent No.: US 7,480,456 B2
Yanagida et al.  (45) Date of Patent: Jan. 20, 2009

(54) IMAGE PICKUP APPARATUS AND RECORDING METHOD

(75) Inventors: Toshiharu Yanagida, Tokyo (JP); Kuniya Hayashi, Chiba (JP); Yuko Aoki, Tokyo (JP)

(73) Assignee: Sony Corporation (JP)

( * ) Notice: Subject to any disclaimer, the term of this patent is extended or adjusted under 35 U.S.C. 154(b) by 159 days.

(21) Appl. No.: 10/526,944

(22) PCT Filed: Nov. 12, 2003

(86) PCT No.: PCT/JP03/14356

§ 371 (c)(1),
(2), (4) Date: Sep. 15, 2005

(87) PCT Pub. No.: WO2004/049708

PCT Pub. Date: Jun. 10, 2004

(65) Prior Publication Data

US 2006/0110153 A1    May 25, 2006

(30) Foreign Application Priority Data

Nov. 26, 2002    (JP) .............................. 2002-342536

(51) Int. Cl.
*G03B 17/24* (2006.01)
*H04N 5/225* (2006.01)
*H04N 5/76* (2006.01)

(52) U.S. Cl. .................. 396/310; 396/321; 348/207.11; 348/231.6

(58) Field of Classification Search ................. 396/310, 396/321, 211; 348/231.3, 231.6, 207.2, 207.11, 348/231.99; 710/62; 365/185.17
See application file for complete search history.

(56) References Cited

U.S. PATENT DOCUMENTS 5,739,850 A * 4/1998 Hori ....................... 348/231.99
2004/0141069 A1 * 7/2004 Nakami .................... 348/231.6

FOREIGN PATENT DOCUMENTS

| JP | 5-064167 A | 3/1993 |
| JP | 6-078260 A | 3/1994 |
| JP | 8-251528 A | 9/1996 |

* cited by examiner

*Primary Examiner*—Melissa Jan Koval
(74) *Attorney, Agent, or Firm*—Lerner, David, Littenberg, Krumholz & Mentlik, LLP

(57) ABSTRACT

An image pickup apparatus and recording method that can further improve ease-of-use for the user creates directories according to shooting situations selected from multiple predetermined types of shooting situations, assigns image data produced as a result of photographing a subject to the directories according to the selected shooting situations, attaches identification information to the image data according to the selected shooting situations, and stores the image data to which the identification information is attached, together with an application program of one or more specified applications, so as to associate the image data with the applications.

12 Claims, 8 Drawing Sheets

| MARK | SCENE NAME |
|---|---|
|  | GOURMET MEAL |
|  | DATING |
|  | DRINKING PARTY |
|  | TRAVEL |
|  | SPORTS |
|  | FAMILY |
|  | MYSELF |
|  | Auto |

IMAGE PICKUP APPARATUS AND RECORDING METHOD

TECHNICAL FIELD

The present invention relates to an image pickup apparatus and recording method, which are suitable, for example, for a digital camera which records images picked up by an image pickup element on a recording medium.

BACKGROUND ART

Conventionally, digital cameras of this type record video images formed on a CCD on a memory card as a plurality of still images, read desired still images selectively from the memory card as required, and display them on an LCD attached to the camera body or on a home television set or personal computer monitor connected externally.

With such digital cameras, generally image data resulting from the images of subjects picked up is recorded in files classified by shooting modes on a memory card based on serial numbers which represent the order of shooting as well as on the date/time of shooting and the like.

When a user wants to review, on a digital camera, a desired image in an image group recorded on a memory card, the user searches for the desired image visually by displaying the image group read from the memory card on a liquid crystal monitor in full screen on a image by image basis or as an index screen in units of several images.

However, this method of searching for the desired image while displaying images one by one on a liquid crystal monitor is practical only when there are a relatively small number of photographic images. When there are a very large number of photographic images such as when a large capacity memory card is used, it is very difficult for the user to search for a desired image by checking a huge number of images visually on a liquid crystal monitor.

To deal with this situation, actually a memory card taken out of a digital camera is mounted on a personal computer, or the digital camera is connected, for example, via a communications cable such as a USB (Universal Serial Bus) cable, and a plurality of files are often managed hierarchically using a directory corresponding to the memory card and presented on a display screen.

With a typical personal computer, when a memory card is mounted, the directory corresponding to the memory card is presented on the display screen either automatically or in response to a user action. Then, the directory is opened in response to a user action and a plurality of files contained in the directory are displayed.

The user can search for a file in a shooting mode which corresponds to a desired image among the plurality of files, open the file, select a desired image name from among images contained in the file, and thereby display the image which has the selected name on the display screen.

Among hierarchical file management methods which employ such directories, a method has been proposed recently which makes it easy to search for and edit images during playback by classifying the directories, for example, into "Portraits," "Group Photos," "Scenery," "Close-Ups," "Sports," "Automatic Selection," etc. according to the type of photographed subject, selecting one directory based on the user's selection during shooting or according to image pattern analysis based on results of photography, and attaching information about the directory to corresponding image data (see, for example, Patent Document 1).

Patent Document 1: Japanese Patent Laid-Open No. 6-78260 (pages 3 and 4, and FIGS. 3 and 5)

However, when a memory card containing image data to which directory information classified according to the type of subject is attached is mounted on a personal computer and played back, only directories are presented on the display screen, and relationship between directories and data contained in them must be specified by the user.

There is no problem only if desired application software has been installed on the user's personal computer. Otherwise, the user must purchase such application software or create an executable application program for himself/herself, which constitutes a heavy burden because of required time and effort.

DISCLOSURE OF THE INVENTION

The present invention has been made in view of the above points and is intended to propose an image pickup apparatus and recording method which can further improve ease-of-use for the user.

To solve the above problem, the present invention comprises: photographic means for photographing a subject; directory creation means for creating directories according to shooting situations selected from multiple predetermined types of shooting situation; assigning means for assigning image data produced by the photographic means as a result of photography to the directories according to the selected shooting situations; attaching means for attaching identification information to the image data according to the selected shooting situations; and storage means for storing the image data to which the identification information is attached, together with an application program of one or more specified applications so as to associate the image data with the applications.

Consequently, after photographs are taken with the image pickup apparatus, when playing back contents of the storage means, it is possible not only to display image data classified by shooting situations and stored in the storage means, but also to display, as required, the application(s) provided by the application program, together with the associated image data. This makes it possible to use the application(s) effectively.

Also, the present invention comprises: a first step of creating directories according to shooting situations selected from multiple predetermined types of shooting situation; a second step of assigning image data produced as a result of photographing subjects to the directories according to the selected shooting situations; a third step of attaching identification information to the image data according to the selected shooting situations; and a fourth step of storing the image data to which the identification information is attached, together with an application program of one or more specified applications so as to associate the image data with the applications.

Consequently, when playing back contents of the storage means after photographs are taken, this recording method can not only display image data classified by shooting situations and stored in the storage means, but also display, as required, the application(s) provided by the application program, together with the associated image data. This makes it possible to use the application(s) effectively.

BEST MODE FOR CARRYING OUT THE INVENTION

An embodiment of the present invention will be described with reference to the drawings.

(1) FIRST EMBODIMENT (1-1) External Configuration of Digital Camera

Figure 1:
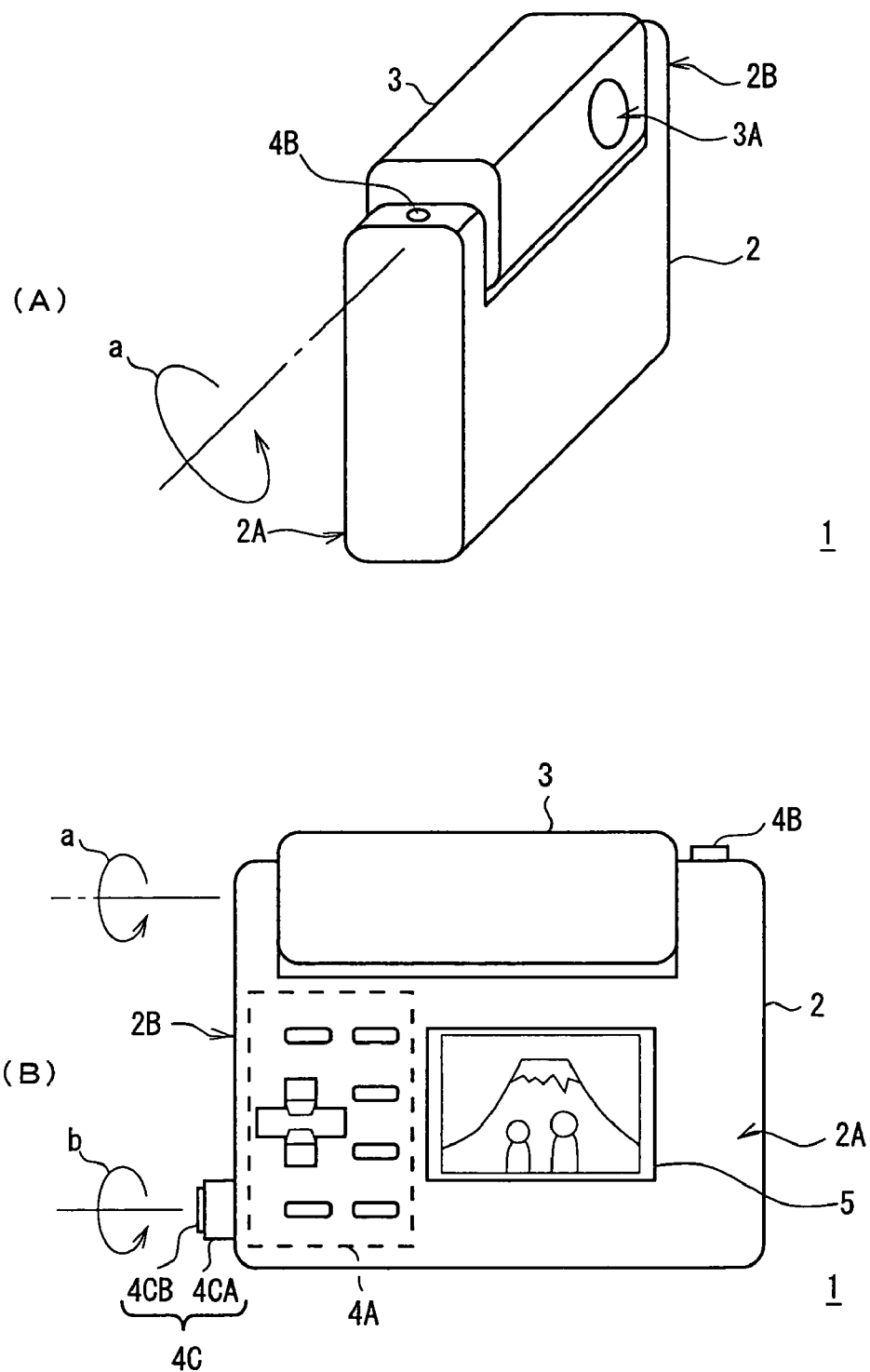
FIG. 1 is a schematic diagram showing an external configuration of a digital camera according to this embodiment.

Referring to FIG. 1, reference numeral 1 denotes a digital camera as a whole according to this embodiment. The digital camera 1 comprises a main body 2 with a recess formed in the upper end and a roughly rectangular block-shaped camera section 3 which fits in the recess in the main body 2. The camera section 3 is supported in the recess in the main body 2 in such a way that it can rotate along and against arrow a.

On the back face 2A of the main body 2 is a liquid crystal monitor 5 which displays photographed images. Also, there are controls 4A including a group of switches such as a mode switching dial, menu key, multi-functional cross key, and power switch. On the upper end face is a shutter button 4B.

Protruding from one flank 2B of the main body 2 is a control (hereinafter referred to as a stick dial) 4C consisting of a turn knob 4CA which is rotatable along and against arrow b only within a predetermined angle and which exerts a force against the direction of rotation and a pushbutton 4CB which is attached to the top of the turn knob 4CA and which can be pressed in the direction of the rotation axis.

On one face of the camera section 3 are a taking lens 3A, viewfinder window, flash (not shown), etc. while on the other face are a view finder and various lamps (not shown) attached to the view finder.

Thus, when the user positions the camera section 3 at a desired angle to the main body 2 and presses the shutter button 4B, the digital camera 1 photographs a subject displayed on the liquid crystal monitor 5 or in the view finder.

(1-2) Internal Configuration of Digital Camera

Figure 2:
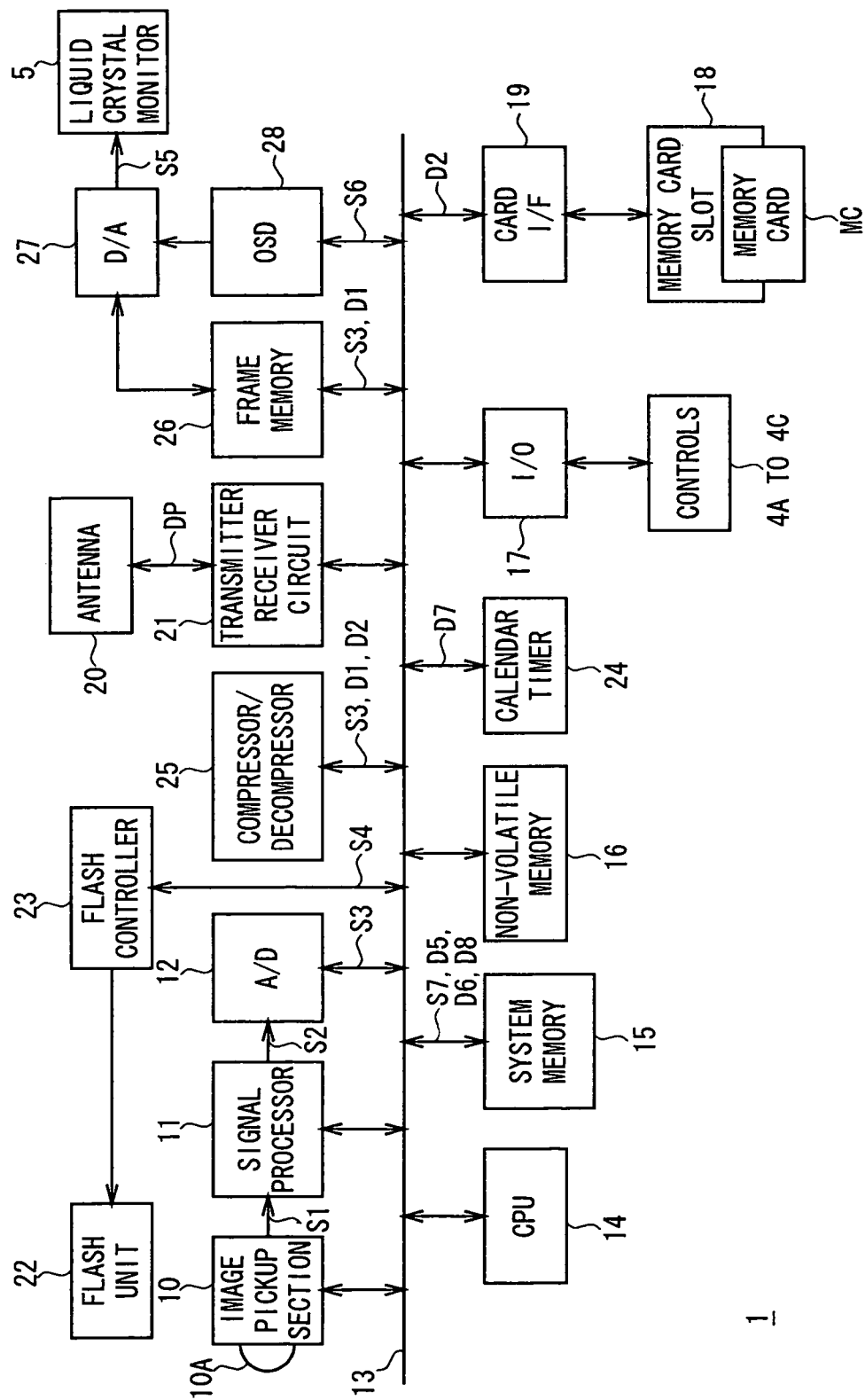
FIG. 2 is a schematic diagram showing an internal configuration of the digital camera according to this embodiment.
Figure 3:
FIG. 3 is a schematic diagram showing scene names and corresponding marks classified by shooting situations.
Figure 3:
Figure 3:
Figure 3:
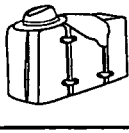
Figure 3:
Figure 3:
Figure 3:
Figure 3:

FIG. 2 shows an internal configuration of the digital camera 1 according to this embodiment. An image pickup section 10 photoelectrically converts an imaging light entering through a projection lens 10A on an imaging surface of a CCD (Charge Coupled Device) and thereby produces an imaging signal S1. Then it sends out the imaging signal S1 to a CDS (Correlated Double Sampling) and AGC (Auto Gain Control) section (not shown) in a signal processor 11.

During a period when reset noise appears in the imaging signal S1, the CDS and AGC section clamps the signal level of the reset noise with a predetermined potential to reduce a noise component and automatically adjusts the amplitude of the imaging signal S1 to control the output level to a predetermined value, and thereby prevents contrast variations.

Then, the signal processor 11 subjects the imaging signal S1 to Y/C separation, gamma correction, white balance adjustment, etc., converts the signal into a video signal S2 through matrix processing, and then converts the signal into a digital video signal S3 via an analog/digital (A/D) converter 12.

The image pickup section 10, signal processor 11, and A/D converter 12 are connected via a bus 13 to a CPU (Central Processing Unit) 14 which controls the entire digital camera 1, and perform various operations under the control of the CPU 14.

Also, the CPU 14 is connected with a system memory 15 and a non-volatile memory 16 via the bus 13, where the system memory 15 consists of a ROM (Read Only Memory) which stores operating programs and various constants and a RAM (Random Access Memory) which serves as a work area during program execution and can record images while the non-volatile memory 16 can retain various constants and various information related to operation of the digital camera 1 even during power shutdown. The CPU 14 can record and retrieve various data to/from the memories 15 and 16 as required.

Furthermore, the CPU 14 is also connected, via an I/O (Input/Output) port 17 and the bus 13, with the controls 4A to 4C consisting of the various key buttons and the like described above. Also, the CPU 14 is connected with a memory card slot 18 via a card interface 19 and the bus 13. Furthermore, the CPU 14 is connected with a GPS (Global Positioning System) antenna 20 via a transmitter receiver circuit 21 and the bus 13. The CPU 14 receives signals transmitted according to user's operation of the controls 4A to 4C, signals transmitted according to insertion and removal of a memory card MC, and location information DP based on radio waves received from satellites.

Furthermore, the CPU 14 is connected via the bus 13 with a flash controller 23 which controls firing of a flash unit 22 used to boost light amount on a subject during shooting. It sends out a drive signal S4 to the flash controller 23 to fire the flash unit 22 according to user preset values in the image pickup section or the brightness of shooting environment determined automatically.

Incidentally, the CPU 14 is connected via the bus 13 with a calendar timer 24 which manages shooting dates/time, battery operating time, etc. This allows the CPU 14 to manage time constantly, attach shooting time to pictures, and calculate remaining battery time.

Then, the CPU 14 sends the digital video signal S3 obtained via the image pickup section 10, signal processor 11, and A/D converter 12 to a data compressor/decompressor 25. When checking subjects normally (i.e., when shooting moving images), the data compressor/decompressor 25, under the control of the CPU 14, writes the digital video signal S3 into a frame memory 26 on a frame-by-frame basis, concurrently converts it into a composite signal S5 in a predetermined format (e.g., NTSC (National Television System Committee) format) via a digital/analog (D/A) converter 27 and sends out the resulting signal to the liquid crystal monitor 5. Consequently, the moving images are displayed on the display screen of the liquid crystal monitor 5 based on the composite signal S5.

When the user presses the shutter button 4B (i.e., when shooting still images), the CPU 14 writes the digital video signal S3 into the frame memory 26 while it reads image data DI of the frame image picked up when the shutter is released from among frame images provided by the digital video signal S3, sends out the image data DI to the data compressor/decompressor 25 via the bus 13, and concurrently displays the relevant frame image DI from among the moving images provided by the composite signal S5 on the display screen of the liquid crystal monitor 5 via the frame memory 26 and D/A converter 27.

The data compressor/decompressor 25 compression-encodes the image data DI read from the frame memory 26, based, for example, on the JPEG (Joint Photographic Experts Group) standard, and thereby obtains a frame image with compressed image information. Image data D2 of the compressed frame image thus obtained is written into the memory card MC in the memory card slot 18 via a card interface 19 under the control of the CPU 14.

When the user selects a shooting mode using the mode switching dial of the controls 4A, the CPU 14 sends out a Read signal S6 to an on-screen display (OSD) section 28 to read a menu bar which represents a settings menu of the shooting mode from the on-screen display section 28, and superimposes the menu bar on the frame image constituted of the image data D1 on the liquid crystal monitor 5 via the D/A converter 27.

When the user selects a menu which represents "Select Applications" from the menu bar displayed on the liquid crystal monitor 5, two application names, "Diary" and "Map," at a lower level are further displayed on the liquid crystal monitor 5.

When the user selects one of the application names (e.g., "Diary"), the CPU 14 sends out an application selection signal S7 to the system memory 15 and reads program data D5 of the application program out of the two application programs stored in the system memory 15.

Then, when the user chooses to turn on a menu which represents a "Scene Select Function" on the menu bar displayed on the liquid crystal monitor 5, a plurality of scene names which correspond to shooting situations of subjects become selectable one after another according to rotation of the turn knob 4CA of the stick dial 4C.

The shooting situations of subjects (scene names) include "Gourmet meal," "Dating," "Drinking Party," "Travel," "Sports," "Family," "Myself," "Auto," etc. As the user rotates the turn knob 4CA of the stick dial 4C, the respective scene names are displayed one after another together with corresponding marks on the liquid crystal monitor 5.

Then, as the user presses the pushbutton 4CB of the stick dial 4C, the shooting situation is determined according to the scene name and icon currently displayed on the liquid crystal monitor 5. The CPU 14 reads image format corresponding to the shooting situation from the system memory 15 and sends it to the data compressor/decompressor 25 via the bus 13.

When compression-encoding the frame image D1 read out of the frame memory 26 based on the JPEG standard under the control of the CPU 14, the data compressor/decompressor 25 records various information in a header section of the image data D1 of the frame image: namely, situation identification information D6 which was selected by the user; time information D7 which is obtained from the calendar timer 24 and represents the shooting date/time; and image recording information D8 which represents image specified conditions including the image format, pixel count, compression ratio, file size, and image aspect ratio respectively read out of the system memory 15.

The compressed frame image constituted of the image data D2 resulting from actual compression-encoding has been standardized using data format based on the JPEG standard. In a hierarchical coding scheme, as shown in FIGS. 4(A) to 4(D), the image data D2 of one image has a four-layer structure consisting of an image layer CL1 (FIG. 4(A)), frame layer CL2 (FIG. 4(B)), scan layer CL3 (FIG. 4(C)), and image data layer CL4 (FIG. 4(D)). A marker code which indicates the meaning of data has been defined for each layer.

Figure 4:
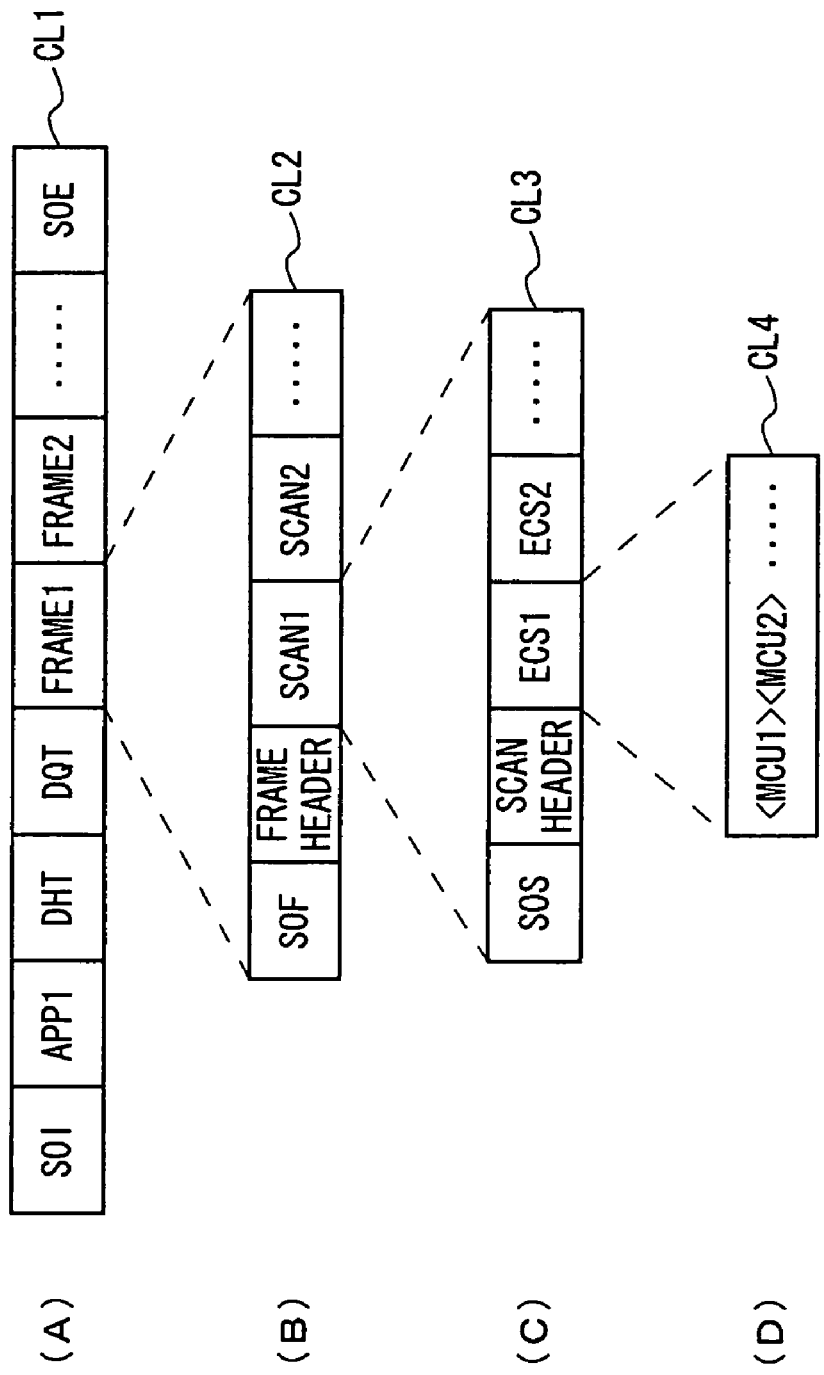
FIG. 4 is a schematic diagram illustrating a data format of image data.

For example, in a JPEG-compressed data string based on Huffman coding which is a type of variable length coding, the uppermost image layer CL1 (FIG. 4(A)), is sandwiched by SOI (Start of Image) and EOI (End of Image) marker codes which indicate the start and end of the entire image. The SOI marker code is followed by an APP1 (Reserved for Application Segments 1) marker code which can be used freely by applications, DHT (Undefined Huffman Table) marker code used to update Huffman coding tables, DQT (Define Quantization Table) marker code used to update quantization tables, and then the frame layer CL2 which contains a plurality of frames.

In the case of hierarchical coding, frame layer CL2 (FIG. 4(B)) contains as many frames as there are layers. Each frame contains an SOF (Start of Frame) marker code which indicates the start, followed by a frame header which describes information about the frame, and then the scan layer CL3 which contains a plurality of scans.

The scan layer CL3 (FIG. 4(C)) contains an SOS (Start of Scan) marker code which indicates the start, followed by a scan header which describes information about the scan, and then the image data layer CL4 which contains a plurality of ECS (Entropy Coded Segment) marker codes. The image data layer CL4 (FIG. 4(D)) describes a plurality of MCUs (Minimum Coded Units) which is a minimum unit for being coded for each ECS marker code.

When actually performing JPEG-based compression-encoding of the frame image constituted of the image data D1 read out of the frame memory 26, the data compressor/decompressor 25 writes, for each frame image, the situation identification information D6, time information D7, and image recording information D8 into the APP1 (Reserved for Application Segments 1) marker code in the image layer CL1 of the JPEG-based data format.

In this way, the CPU 14 compiles the image data D2, with the situation identification information D6, time information D7, and image recording information D8 described in the header section, into as many image files as there are photos, for each shooting situation. Then, the CPU 14 writes the image files into the memory card MC in the memory card slot 18 via the bus 13 and card interface 19 after associating them with contents of the application program constituted of the program data D5 selected by the user.

A program which associates image files in each shooting situation with contents of an application program is contained in the application program, so that the image files are captured automatically into the application program when the application program is executed.

When the user plays back the memory card MC taken out of the digital camera 1, for example, on a personal computer (not shown) which he/she owns, an icon of a directory which corresponds to the memory card MC is displayed on the display screen (W1 in FIG. 5) under an operating system (OS) running on the computer. When the user opens the directory, the display screen presents an icon of a directory corresponding to the digital camera 1 and an icon (e.g., "Photo Diary" which represents a diary) corresponding to the application program.

Figure 5:
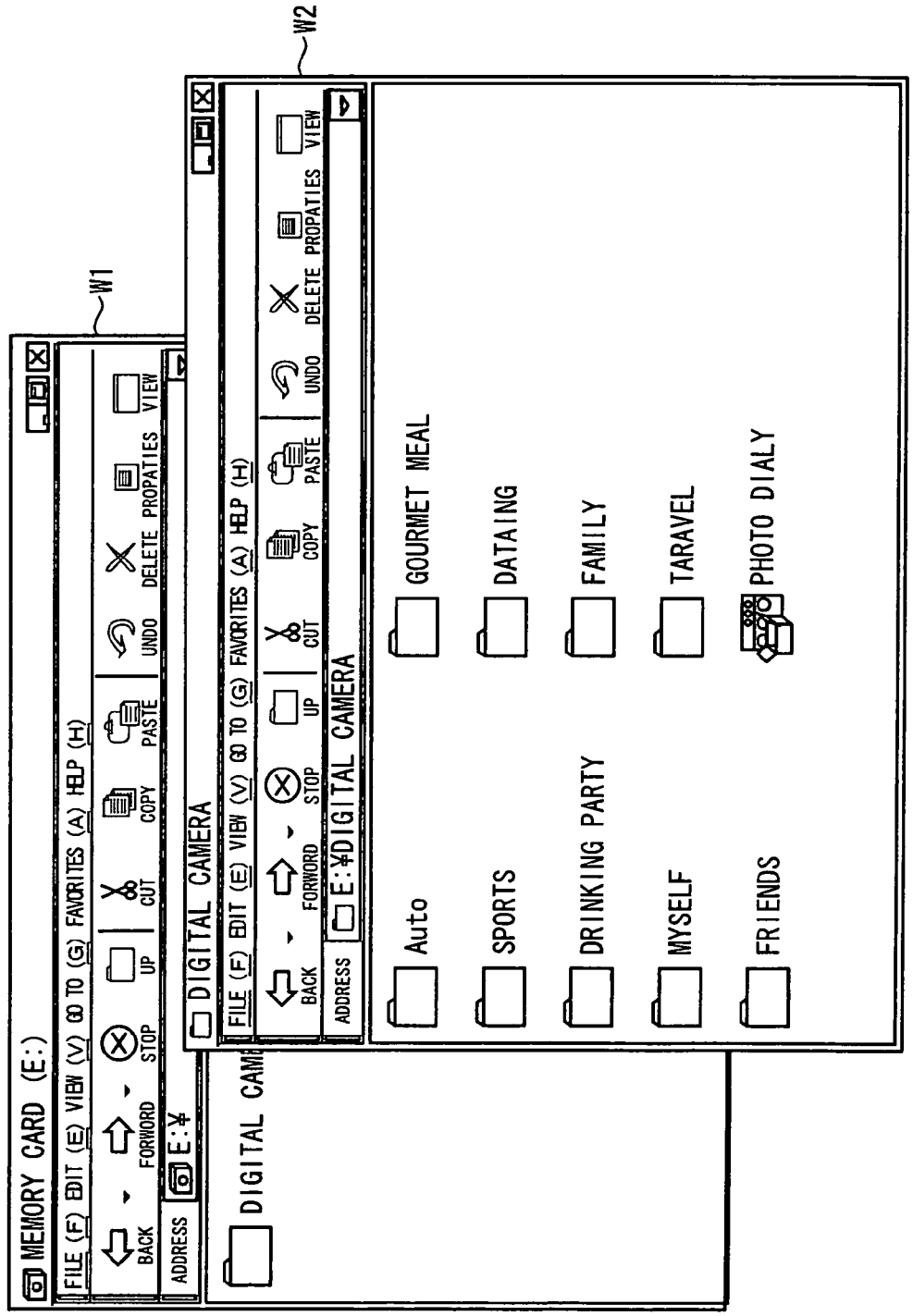
FIG. 5 is a schematic plan view illustrating directory display on a display screen.

When the user opens the directory corresponding to the digital camera 1, as many directories as there are types of situation identification information (i.e., types of shooting situation) are listed on the display screen (W2 in FIG. 5). When the user opens any desired one of the directories, image files created in the shooting situation corresponding to the directory are displayed, allowing the user to display any of the compressed frame images stored as the image data D2 in the image files.

When the application program constituted of the program data D5 and installed by the user is executed, a predetermined application screen is displayed on the display screen together with associated image files in each shooting situation (i.e., situation identification information D6) corresponding to a scene name.

Figure 6:
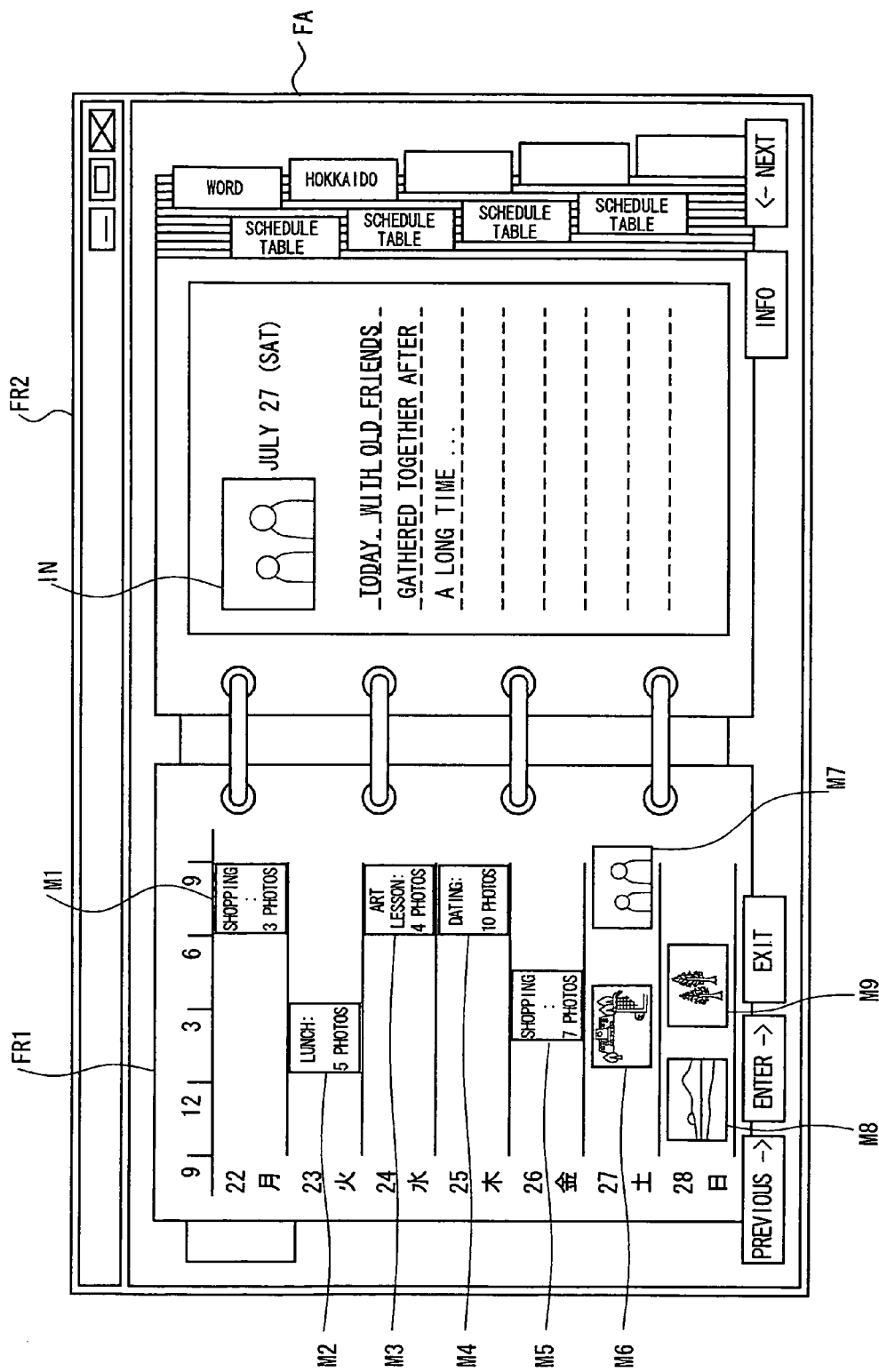
FIG. 6 is a schematic plan view illustrating an application screen associated with image files.

For example, in the case of the "Photo Diary" application which represents a diary, the display screen presents an application screen FA consisting of a schedule pane FR1 and memo pane FR2, which are presented on the left and right as if a diary were opened, as shown in FIG. 6.

In the application screen FA, the schedule pane FR1 on the left is a weekly calendar screen which divides 12 hours from 9 a.m. to 9 p.m. on each day into 3-hour blocks. Fields (hereinafter referred to as scene display fields) M1 to M9 corresponding to the shooting situation (i.e., situation identification information D6) are displayed for respective 3-hour blocks based on the shooting date/time.

The scene display fields M1 to M9 display the scene name and the number of-shots using a GUI (Graphical User Interface) if two or more images are shot per 3-hour period (M1 to M5). They display index images M6 to M9 obtained by scaling down images at a predetermined rate only if a single shot is taken per period.

When the user performs an appropriate operation with respect to any of the scene display fields M1 to M5 which contain two or more images, all the images contained in the scene display fields M1 to M5 are listed as index images (not shown) reduced to a predetermined size. An index image selected by the user can be displayed in place of the original scene display field which showed only a scene name and the number of shots.

Upper part of the memo pane FR2 on the right displays the index image IN selected by the user from the schedule pane FR1 by enlarging it to a predetermined size. It also displays the shooting date/time of the image next to the index image IN. A memo field is displayed below the index image IN to allow the user to enter comments in text format or the like. On the application screen FA, two or more memo panes FR2 can be specified per schedule pane FR1 and displayed hierarchically and/or selectively.

(1-3) Procedures for Recording on Memory Card According to First Embodiment

Figure 7:
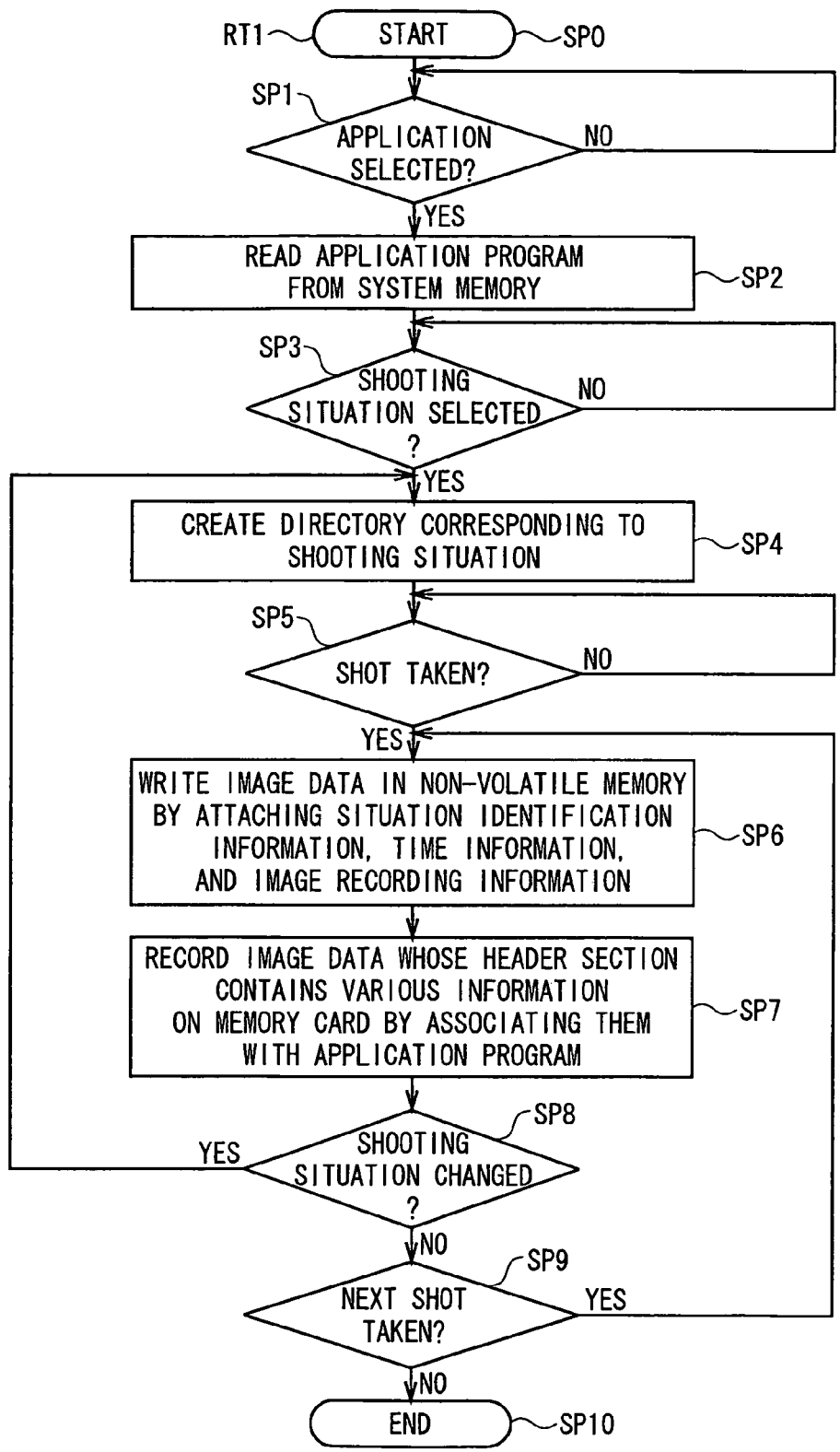
FIG. 7 is a flowchart illustrating procedures for recording on a memory card according to a first embodiment.

When the user actually powers on the digital camera 1, the CPU 14 starts image data recording procedures RT1 in FIG. 7 beginning with Step SP0. Then, in Step SP1, the CPU 14 waits for an application program to be selected.

Then, in Step SP2, the CPU 14 reads the program data D5 of the selected application program out of the system memory 15. Then, the CPU 14 goes to Step SP3, where the CPU 14 waits for the user to select a shooting situation (type) of subjects by operating the control 4C.

When the user selects a shooting situation of subjects, the CPU 14 goes to Step SP4, where it creates a directory according to the selected shooting situation. Then, the CPU 14 goes to Step SP5.

In Step SP5, the CPU 14 determines whether or not a subject was photographed by the user. Only if the answer is Yes, the CPU 14 goes to Step SP6, where it makes the data compressor/decompressor 25 describe situation identification information D6, time information D7, and image recording information D8 in the header section of the image data D1 obtained as a result of imaging, in the data format used for compression-encoding. Then, the image data D2 are assigned to the directory and written into the non-volatile memory 16 with the situation identification information D6, time information D7, and image recording information D8 described in the header section.

Then, the CPU 14 goes to Step SP7, where it records the image data D2 whose header section contains the various information on the memory card MC by associating them with the application program constituted of the program data D5.

Then, the CPU 14 determines in Step SP8 whether the user changed the shooting situation of subjects. If the answer is Yes, the CPU 14 returns to Step SP4, where it creates a directory corresponding to the changed shooting situation. Then, the CPU 14 repeats Steps SP5 to SP8 in a manner similar to the one described above.

On the other hand, if the answer in Step SP8 is No, meaning that the current shooting situation is maintained, the CPU 14 goes to Step SP9, where it determines whether or not the user took a next shot.

If the answer in Step SP9 is Yes, the CPU 14 returns to Step SP6 to process the results of photography and makes the data compressor/decompressor 25 describe situation identification information D6, time information D7, and image recording information D8 in the header section of the image data D1 obtained as a result of imaging, in the data format used for compression-encoding. Then, the CPU 14 repeats Step SP7 and subsequent steps in a manner similar to the one described above.

On the other hand, if the answer in Step SP9 is No, this means that the user powered off the digital camera 1 or that the shooting mode was switched to another mode such as playback mode. Consequently, the CPU 14 goes directly to Step SP10 and finishes the image data recording procedures RT1.

(1-4) Operation and Effect of First Embodiment

In the above configuration, when the user selects a desired application and then a desired shooting situation, the digital camera 1 creates a directory according to the shooting situation. Then, the image data D1 obtained as the user takes shot after shot are assigned to the directory.

Then, the digital camera 1 compression-encodes the image data DI as the results of photography when they are assigned to the directories for all the shooting situations selected by the user. In so doing, the digital camera 1 describes situation identification information D6 which represents the shooting situation, time information D7 which represents the shooting date/time, and image recording information D8 which represents conditions specified for the image in the header section of the image data D1 of each image, in the predetermined data format.

Then, the digital camera 1 records all the image data D2 whose header section contains the various information on the memory card MC by associating them with the application program of the application selected by the user.

When the user plays back on a personal computer the image data D1 contained in the memory card MC after shooting, an icon of a directory which corresponds to the memory card MC is displayed on the display screen. Also, a directory corresponding to the digital camera 1 and an icon corresponding to the application program are displayed under the memory card directory. When the user opens the directory corresponding to the digital camera 1, as many directories as there are types of situation identification information are listed on the display screen.

When the application program installed by the user is executed, a predetermined application screen is displayed on the display screen together with associated image files in each shooting situation.

Thus, the user can incorporate image files into the application screen according to the shooting situation through various edit operations such as displaying desired images from image files, as required, in desired part of the application screen on the display screen by viewing the screen. This makes it possible to use the application effectively.

With the above configuration, when the user takes shot after shot with a desired application and a desired shooting situation selected, the digital camera 1 assigns the image data D1 obtained as a result of the shooting to corresponding directories organized according to shooting situations, compression-encodes the image data D1 after describing situation identification information D6, time information D7, and image recording information D8 in the header section, in the predetermined data format, and records all the image data D2 whose header section contains the various information on the memory card MC by associating them with the application program of the selected application. Consequently, by playing back the memory card MC on a personal computer after shooting, the user can not only display the image files per shooting situation on the display screen by reading them out of the memory card MC, but also display the application screen of the application program by associating them with the image file. This further improves ease-of-use for the user.

(2) SECOND EMBODIMENT

The digital camera 1 according to the second embodiment has the same configuration as that of the first embodiment described above and performs similar functions and operation except for differences in the method of recording on the memory card MC.

(2-1) Procedures for Recording on Memory Card According to Second Embodiment

Figure 8:
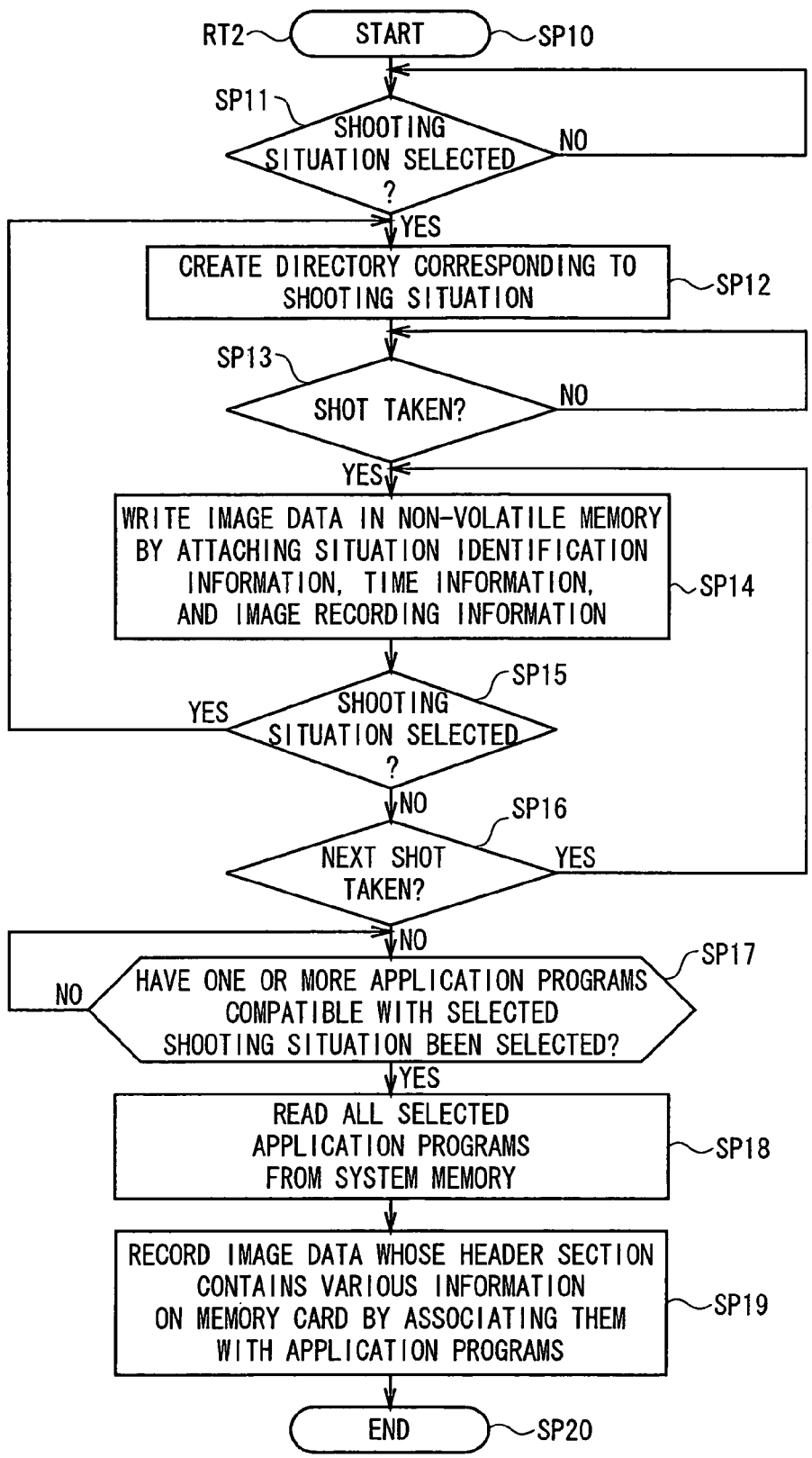
FIG. 8 is a flowchart illustrating procedures for recording on a memory card according to a second embodiment.

When the user actually powers on the digital camera 1, the CPU 14 starts image data recording procedures RT2 in FIG. 8 beginning with Step SP10. Then, in Step SP11, the CPU 14 waits for the user to select a shooting situation of subjects by operating the control 4C.

When the user selects a shooting situation of subjects, the CPU 14 goes to Step SP12, where it creates a directory according to the selected shooting situation. Then, the CPU 14 goes to Step SP13.

In Step SP13, the CPU 14 determines whether or not a subject was photographed by the user. Only if the answer is Yes, the CPU 14 goes to Step SP14, where it makes the data compressor/decompressor 25 describe situation identification information D6, time information D7, and image recording information D8 in the header section of the image data D1 obtained as a result of imaging, in the data format used for compression-encoding. Then, the image data D2 are assigned to the directory and written into the non-volatile memory 16 with the situation identification information D6, time information D7, and image recording information D8 described in the header section.

Then, the CPU 14 determines in Step SP15 whether the user changed the shooting situation of subjects. If the answer is Yes, the CPU 14 returns to Step SP12, where it creates a directory corresponding to the changed shooting situation. Then, the CPU 14 repeats Steps SP13 to SP15 in a manner similar to the one described above.

On the other hand, if the answer in Step SP15 is No, meaning that the current shooting situation is maintained, the CPU 14 goes to Step SP16, where it determines whether or not the user took a next shot.

If the answer in Step SP16 is Yes, the CPU 14 returns to Step SP14 to process the results of photography and makes the data compressor/decompressor 25 describe situation identification information, time information, and image recording information in the header section of the image data D1 obtained as a result of imaging, in the data format used for compression-encoding. Then, the CPU 14 repeats Step SP15 and subsequent steps in a manner similar to the one described above.

On the other hand, if the answer in Step SP16 is No, this means that the user powered off the digital camera 1 or that the shooting mode was switched to another mode such as playback mode. Consequently, the CPU 14 goes to Step SP17, where it determines whether or not one or more application programs compatible with all the selected shooting situations have been selected. The CPU 14 goes to Step SP18 only if the answer is Yes.

In Step SP18, the CPU 14 reads the program data D5 of all the selected application programs out of the system memory 15. Then, it goes directly to Step SP19, where it records the image data D2 whose header section contains various information on the memory card MC by associating them with the application programs constituted of the program data D5.

Then, the CPU 14 goes directly to Step SP20 and finishes the image data recording procedures RT2.

(2-2) Operation and Effect of Second Embodiment

In the above configuration, when the user selects a desired shooting situation, the digital camera creates a directory. Then, the image data D1 obtained as the user takes shot after shot are assigned to the directory.

Then, the digital camera 1 compression-encodes the image data when they are assigned to the directories for all the shooting situations selected by the user. In so doing, the digital camera 1 describes situation identification information D6 which represents the shooting situation, time information D7 which represents the shooting date/time, and image recording information D8 which represents conditions specified for the image in the header section of the image data D1 of each image, in the predetermined data format.

Then, if one or more application programs compatible with all the selected shooting situations are selected by the user, the digital camera 1 records the application programs on the memory card MC by associating them with the image data D2 whose header section contains the various information.

When the user plays back on a personal computer the image data D2 contained in the memory card MC, an icon of a directory which corresponds to the memory card MC is displayed on the display screen. Also, a directory corresponding to the digital camera 1 and icons corresponding to all the selected application programs are displayed under the memory card directory. When the user opens the directory corresponding to the digital camera 1, as many directories as there are types of situation identification information are listed on the display screen.

When the desired application program installed by the user is executed, a predetermined application screen is displayed on the display screen together with associated image files in each shooting situation.

Thus, the user can incorporate image files into the application screen according to the shooting situation through various edit operations such as displaying desired images from image files, as required, in desired part of the application screen on the display screen by viewing the screen. This makes it possible to use the application effectively.

With the digital camera 1, since, after all shooting situations are selected, one or more applications are selected from among applications respectively compatible with the selected shooting situations, it is possible to avoid a situation in which there would be an application associated with no image file assigned to a shooting situation. Consequently, when the user plays back a memory card on a personal computer, it is possible to avoid a situation in which a directory of an application associated with no image file would be displayed on the display screen, and thus save the user the work of deleting such a directory from the screen.

With the above configuration, when the user takes shot after shot with a desired shooting situation selected, the digital camera 1 assigns the image data D1 obtained as a result of the shooting to corresponding directories organized according to shooting situations, compression-encodes the image data D1 after describing situation identification information D6, time information D7, and image recording information D8 in the header section, in the predetermined data format, and records on the memory card MC all the image data D2 whose header section contains the various information by associating them with the application program of one or more applications selected from among applications compatible with all the selected shooting situations. Consequently, by playing back the memory card MC on a personal computer after shooting, the user can not only display the image files per shooting situation on the display screen by reading them out of the memory card MC, but also display the application screen of the application program by associating them with the image data for each shooting situation. This further improves ease-of-use for-the user.

(3) OTHER EMBODIMENTS

Incidentally, although the first and second embodiments described above have cited the digital camera 1 shown in FIGS. 1 and 2 as the image pickup apparatus according to the present invention, the present invention is not limited to this and can be applied to image pickup apparatus of various other configurations.

Also, although according to the first and second embodiments, the image pickup means for photographing a subject is composed of the image pickup section 10, signal processor 11, and A/D converter 12, the present invention is not limited to this and may be applied to image pickup means of various other configurations, provided that the image pickup means can obtain results of photographing a subject as image data.

Furthermore, although according to the first and second embodiments, the directory creation means which creates directories according to selected shooting situations from predetermined kinds of shooting situations is constituted of the CPU 14, the present invention is not limited to this and may be applied to directory creation means of various other configurations, provided that the directory creation means can create a directory each time a shooting situation is newly selected.

Furthermore, although according to the first and second embodiments, the assigning means which assigns the image data D1 obtained as a result of photography to corresponding directories organized according to shooting situations is constituted of the CPU 14, the present invention is not limited to this and may be applied to assigning means of various other configurations. Besides, after a desired shooting situation is selected, if all the image data D1 obtained sequentially as a result of photography are assigned to a directory corresponding to the shooting situation, image files constituted of an image data D1 group can be created for each shooting situation.

Furthermore, although according to the first and second embodiments, the attaching means which attaches the situation identification information D6 to the image data D1 according to selected shooting situations is constituted of the data compressor/decompressor 25 and CPU 14, the present invention is not limited to this and may be applied to attaching means of various other configurations.

Although in the example described above, the image data DI are actually compression-encoded in a JPEG-based data format, the image data DI may be managed in another image file format such as TIFF (Tagged Image File Format), DCF (Design Rule for Camera File System), Exif (Exchangeable Image File Format), CIFF (Camera Image File Format), GIF (Graphics Interchange Format), BMP (Bit Map), or PICT (Quick Draw Picture Format), and compression-encoded as required.

In that case, although according to the first and second embodiments, when the image data D1 is associated with a "Photo Diary" application, the time information D7 which represents the shooting date/time and image recording information D8 which represents conditions specified for the image constituted of the image data D1 are attached to the image data together with the situation identification information (identification information) D6, the present invention is not limited to this and various information may be attached to the image data D1 according to the application associated with the image data D1.

For example, if the image data D1 is associated with an "Area Map" application, location information DP about a shooting location for the digital camera 1—provided as a coordinate location in latitude and longitude—may be generated in advance based on radio waves received from satellites via the 20 antenna (FIG. 2) and may be attached to the image data D1 together with the image recording information D8 which represents conditions specified for the image constituted of the image data D1 and the situation identification information (identification information) D6.

Specifically, as an application screen which represents "Area Map", hierarchical images ranging from a map covering a large area to a map covering a small area, for example "World Map," "Japanese Map," "Regional Map," "Prefectural Map," "Municipal Map," or "Street Map" are set to be selectively displayed in response to a user action and point marks are set to be displayed at positions corresponding to all shooting locations contained in the display range of each image by using a GUI. Then, when the user selects a desired point mark using a mouse or the like, it is sufficient to display, as an index image reduced to a predetermined size, the image which corresponds to the point mark by superimposing it over the map image. If the point mark on the map image contains two or more images, all the images may be listed as index images reduced to a predetermined size.

Furthermore, although according to the first and second embodiments, a recording medium such as a memory card which can be mounted externally is used as the storage means for storing image data to which the situation identification information (identification information) D6 is attached, together with an application program of one or more specified applications so as to associate the image data with the applications, the present invention is not limited to this and may use the non-volatile memory 16 installed in the digital camera 1. In that case, the image data and application program may be stored temporarily in the non-volatile memory 16, which may be connected with the personal computer or the like via a USB (Universal serial Bus) interface or the like.

Furthermore, although according to the first and second embodiments, desired shooting situations are selected from multiple types of shooting situation using the stick dial (selection means) 4C among the controls 4A to 4C and marks or scene names (characters) which correspond to the selected shooting situations are displayed one after another on the liquid crystal monitor (display means) 5 in synchronization with the selection, the present invention is not limited to this and may be applied widely to various other selection means and display means, provided that the shooting situations currently selected by the user can be recognized during the selection.

As described above, since the present invention comprises photographic means for photographing a subject, directory creation means for creating directories according to shooting situations selected from multiple predetermined types of shooting situation, assigning means for assigning image data produced by the photographic means as a result of photography to the directories according to the selected shooting situations, attaching means for attaching identification information to the image data according to the selected shooting situations, and storage means for storing the image data to which the identification information is attached, together with an application program of one or more specified applications so as to associate the image data with the applications, it is possible, when playing back contents of storage means after shooting, not only to display the stored image data classified by shooting situations, but also to display, as required, the application(s) provided by the application program, together with the associated image data for each shooting situation. This makes it possible to accomplish an image pickup apparatus which can make effective use of the application(s), further improving ease-of-use for the user.

Also, since the present invention comprises a first step of creating directories according to shooting situations selected from multiple predetermined types of shooting situation, a second step of assigning image data produced as a result of photographing subjects to the directories according to the selected shooting situations, a third step of attaching identification information to the image data according to the selected shooting situations, and a fourth step of storing the image data to which the identification information is attached, together with an application program of one or more specified applications so as to associate the image data with the applications, it is possible, when playing back memory contents after shooting, not only to display the stored image data classified by shooting situations, but also to display, as required, the application(s) provided by the application program, together with the associated image data. This makes it possible to accomplish an image pickup method which can make effective use of the application(s), further improving ease-of-use for the user.

INDUSTRIAL APPLICABILITY

The present invention provides an image pickup apparatus and recording method applicable to digital cameras, camera-equipped cell phones, PDAs (Personal Digital Assistants), etc.

The invention claimed is:

1. The image pickup apparatus comprising:
   photographic means for photographing a subject;
   directory creation means for creating directories according to shooting situations selected from multiple predetermined types of shooting situations;
   assigning means for assigning image data produced by the photographic means as a result of photography to the directories according to the selected shooting situations;
   attaching means for attaching identification information to the image data according to the selected shooting situations; and
   storage means for storing the image data to which the identification information is attached, together with a photo diary application program, so as to associate the image data and shooting situations with the photo diary application.

2. The image pickup apparatus according to claim 1, wherein
   when desired ones of the shooting situations are selected, the assigning means assigns all image data obtained sequentially as a result of photography by the photographic means to directories corresponding to the shooting situations.

3. The image pickup apparatus according to claim 1, wherein
   after all the shooting situations are selected, the one or more applications can select from among ones according to said selected shooting situations.

4. The image pickup apparatus according to claim 1, further comprising:
   selection means for selecting the shooting situations from the multiple predetermined types of shooting situations; and
   display means for displaying marks and/or characters according to the shooting situations being selected sequentially, in synchronization with selection operations by the selection means.

5. The image pickup apparatus according to claim 1, wherein
   the attaching means attaches time information that represents shooting date/time for the photographic means and image recording information that represents conditions specified for the image constituted of the image data to the image data together with the identification information.

6. The image pickup apparatus according to claim 1, wherein
   the attaching means attaches location information that represents a shooting location for the photographic means and image recording information that represents conditions specified for the image constituted of the image data to the image data together with the identification information.

7. A recording method comprising:
   a first step of creating directories according to shooting situations selected from multiple predetermined types of shooting situations;
   a second step of assigning image data produced as a result of photographing subjects to the directories according to the selected shooting situations;
   a third step of attaching identification information to the image data according to the selected shooting situations; and
   a fourth step of storing the image data to which the identification information is attached, together with a photo diary application program, so as to associate the image data and the shooting situations with the photo diary application.

8. The recording method according to claim 7, wherein
when desired ones of the shooting situations are selected, the second step assigns all image data obtained sequentially as a result of photography to directories corresponding to the shooting situations.

9. The recording method according to claim 7, wherein
in the fourth step, after all the shooting situations are selected, the one or more applications can select from among ones according to said selected shooting situations.

10. The recording method according to claim 7, wherein
when selecting the desired shooting situations from the multiple predetermined types of shooting situation, the first step display marks and/or characters according to the shooting situations being selected sequentially.

11. The recording method according to claim 7, wherein
the third step attaches time information that represents shooting date/time and image recording information that represents conditions specified for the image constituted of the image data to the image data together with the identification information.

12. The recording method according to claim 7, wherein
the third step attaches location information that represents a shooting location and image recording information that represents conditions specified for the image constituted of the image data to the image data together with the identification information.

\* \* \* \* \*